INVENTOR.
CLARE N. BURGIS
ROY Y. KAKUDA
BY
ATTORNEY

United States Patent Office 3,440,644
Patented Apr. 22, 1969

3,440,644
SYNCHRO-TO-DIGITAL CONVERTER
Clare N. Burgis, Granada Hills, and Roy Y. Kakuda, Los Angeles, Calif., assignors to General Precision Systems Inc., a corporation of Delaware
Filed Apr. 21, 1965, Ser. No. 449,693
Int. Cl. H04l 3/00; H03k 13/00; G08c 9/00
U.S. Cl. 340—347 23 Claims

ABSTRACT OF THE DISCLOSURE

A shaft position to digital converter in which synchro signal voltages are transformed into two-phase signals that are applied to a four-legged autotransformer connected in a bridge configuration. The autotransformer is multi-tapped and digital logic circuitry coupled to each tap senses the tap at which the signal output registers a null when compared with the reference signal applied to the synchro input.

This invention relates to analog-to-digital conversion systems, and more particularly to a system for converting modulated analog signals into a digital representation.

Use of digital computers for computation and processing devices depends, in part, on interfacing equipment which provides a suitable coupling between the computer and analog inputs. The analog input information into the digital computers is often available in the form of shaft angles which are transmitted electrically by a synchro transmitter. The most common method of converting these electrical signals is by the use of follow up servo modules which consist of a servo amplifier, control transformer, and shaft encoders.

The present invention provides a system for converting analog signal to digital representations by the use of a multitapped transformer in connection with the output leads of a synchro, or the like. The analog-to-digital conversion is performed entirely within the transformer with the polarity of each tap representing a digital state, plus polarities representing a zero, and minus polarities representing a one.

Figure 1:
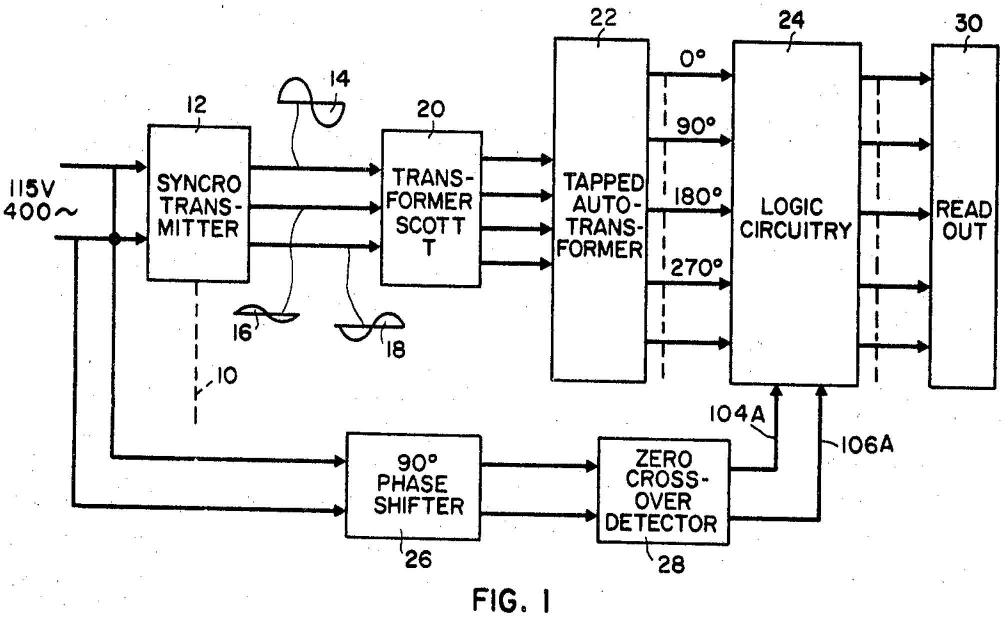
FIGURE 1 illustrates a block diagram of the arrangements of one embodiment of this invention.

Turning now to a detailed description of this invention, it is believed that a general description of how one embodiment of this invention works will be helpful in understanding the detailed descripton of this invention. A means is provided for converting an analog signal such as a sine-cosine function emanating from a sine-cosine function generator into a digital voltage by a voltage summation network which produces a null voltage that is indicative of the particular angle generating the function. More particularly, a sine-cosine generator would be of that type which would convert a shaft position to voltage outputs that provide a sine and cosine function indicative of that angle. Next circuitry is provided which will logically decide a particular angular position, by signals that are a null voltage between the positive function of the cosine and the negative function of the cosine and also a positive function of the sine and a negative function of that sine.

Such sine-cosine generators may be a resolver or a synchronous motor that is coupled to a Scott T transformer, or it may be one of the numerous sine-cosine generators that are well known in the art. The voltage summation network may consist, for example, of autotransformers coupled in bridge configuration having a plurality of taps to indicate a null voltage between the sine and cosine functions or it may consist of a resistive voltage divider, or summation network, that would provide voltages indicative of the particular angle of the shaft through these sine-cosine functions. Logic circuitry is then provided to indicate the exact position of these nulls and actvate readout devices such as electronic displays, or the like, to give a digital or decimal readout indicative of the particular tap that exhibits a null signal which in turn indicates the angular position of the shaft.

One conversion system of a preferred embodiment converts input signals comprising three level carrier signals having specific amplitudes in response to an input shaft. The carier signals are converted into two trigonometric signals (sine, cosine) by a transformer coupled in a Scott T configuration. These trigonometric signals are voltages equal to $\pm E_p \cos \omega t \cos \theta$ and $\pm E_p \sin \omega t \sin \theta$. Where $E_p$ is the voltage magnitude of the carrier signal, $\theta$ is the shaft angle of the synchro transmitter, $\omega t = 2\pi ft$ is the instantaneous position of the carrier frequency.

These two functions are applied across tapped transformers and generate null voltages at distinct taps which are functions of the shaft angle $\theta$. To detect these nulls, amplifiers sense the polarity of the taps. Any change of polarity along the taps would indicate a null existing between these unique taps.

Because the functions previously described have a carrier frequency component, investigations for the null are accomplished during the maximum value of the carrier component. Information storage is provided during the zero crossover of the carrier component. This requirement is fulfilled by the use of bistable devices such as flip-flops, or the like. The flip-flops also provide two level outputs which are used to logically gate the outputs from the tapped transformer. This is necessary to obtain a unique output for every angle. This unique output may then be displayed in a readout system.

Referring now to the drawings, FIGURE 1 is a block diagram showing the basic structure used in implementing one embodiment of the invention. A shaft angle $\theta$, represented by the positon of a shaft 10, which is to be converted into some digital representation, is coupled to a transmitter such as a synchro or resolver or some other type of carrier signal modulating device and denoted by the numeral 12 which will be referred to hereinafter as a synchro. When the term "carrier signal modulating device" is used for synchro or resolver, we are referring to a synchro that produces output voltages in response to angular motions of shaft 12. The output voltages consist of three separate signals, two of which are either in phase or out of phase depending upon the position of shaft 10 of the synchro 12. All transmitter signals will be a particular amplitude ratio depending on the position of the synchro shaft angle and are depicted by the graph 14, 16 and 18 in FIGURE 1. Where the output 14 might be $E_p \sin \omega t \cos \theta$, output 16 might be $$E_p \sin \omega t \cos (\theta + 120°)$$

and output 18 might be $E_p \sin \omega t \cos (\theta - 120°)$. Where 14 denotes a graphic illustration of a sine wave of one particular phase, the numeral 16 indicates a graphic illustration of a signal which is modulated, and the numeral 18 indicates a signal which is shown as 180° different from the signal 14. The modulation of the signals 14, 16, 18 depends upon the angle of the shaft. These specific signals have arbitrarily been coupled with three output lines, but as can be seen, when the angle of shaft 10 is rotated, these signals will vary accordingly; that is, one might reverse going from a positive to a negative, and as the shaft 10 rotates, this happens cyclically.

The input to the synchro 12 is an AC signal; preferably, for this embodiment 115 volts, 400 cycles, was used and is coupled in the usual method to the windings of the shaft 10. The angle of the shaft 10 will hereinafter be referred to by $\theta$.

The outputs generated by the synchro 12 are coupled to a transformer 20 which is connected into a Scott T configuration. Such a configuration is more clearly shown in FIGURE 2 and will be explained in detail later. The coupling of Scott T transformer 20 provides four outputs consisting of two voltages, one of which is the function of $+E_p \sin \omega t \cos \theta$, and a second output of the same winding but of opposite phase is $-E_p \sin \omega t \cos \theta$, while one of the two other outputs is a $+E_p \sin \omega t \sin \theta$ and the other is $-E_p \sin \omega t \sin \theta$. These four outputs are coupled directly across four transformers coupled in a bridge 22, wherein, for instance, $+E_p \sin \omega t \sin \theta$ and $$-E_p \sin \omega t \sin \theta$$

are coupled 180° from each other in the bridge 22 and denote 0° and 180° on the angle $\theta$ of the shaft 10; likewise, $-E_p \sin \omega t \cos \theta$ would be coupled to the 90° connection and the $-E_p \sin \omega t \cos \theta$ would be coupled to the 270° connection of bridge 22 which would be displaced 180° from the voltage $+E_p \sin \omega t \cos \theta$. The transformer bridge 22 is then tapped at specific locations between 0° and 90°, 90° and 180°, 180° and 270°, and 270° to 360° or 0° positions. The angle of the shaft 10 will correspond to that location where a null is detected between any two taps wherein one side of the tap might be some plus voltage, while the other side would be some negative voltage. This is because, as the angle $\theta$ of the shaft 10 changes position, the sine wave angle rotates within the transformer. That is, as the shaft rotates, the exact angle of the shaft is denoted as that angle where, on one tap, a positive going voltage is present, while the next tap will have a negative going voltage. Thus, between these taps a null exists which is then denoted as that particular shaft angle $\theta$. These outputs from the transformer bridge 22 are then coupled into logic circuitry 24, which then detects between which two taps the null is located.

Means have been devised to detect the two taps from the transformer bridge 22 which have the null therebetween. The AC voltage used for operation of the synchro 12 is introduced into a 90° phase shifter 26, which is subsequently introduced into a zero crossover detector circuit 28. A digital voltage will then be produced to correspond to the exact phase of the input voltages, which is then introduced into logic circuitry 24, for detecting the taps between which nulls are located. The logic circuitry 24 is then coupled into some readout display 30.

Figure 2:
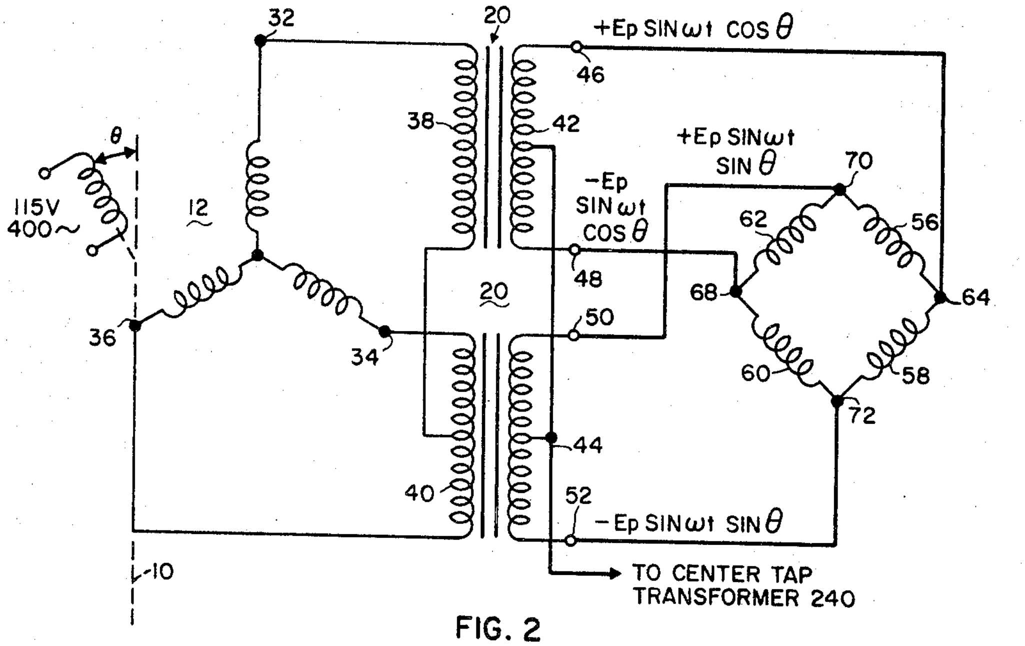
FIGURE 2 shows an electrical schematic of certain components and illustrates their interconnection.

FIGURE 2 illustrates a more specific detail of one embodiment of this invention. The synchro 12 operates in the normal manner which is well known in the art and will not be explained herein. The outputs at terminals

32, 34 and 36 provide a cycling signal as has already been explained and shown in FIGURE 1 by the graphs of sine waves wherein, as the shaft 10 rotates, the sine wave would reverse in a cyclic rotation across the outputs 32, 34 and 36. Terminals 32, 34 and 36 are coupled to the Scott T transformer 20 which is connected as in the configuration shown in FIGURE 2, wherein one end of primary winding 38 is coupled to terminal 32, and the other end of primary winding 38 is coupled to a center tap of a primary winding 40, while primary winding 40 has one end thereof coupled to terminal 34 and the other end of primary winding 40 is coupled to terminal 36 of synchro 12. Secondary windings 42 and 44 of the Scott T transformer 20 provide four distinct outputs. Secondary winding 42, inductively coupled to primary winding 38, provides a pair of output voltage $+E_p \sin \omega t \cos \theta$ and $-E_p \sin \omega t \cos \theta$. Secondary winding 44 is inductively coupled to primary winding 40 and provides outputs $+E_p \sin \omega t \sin \theta$ and $-E_p \sin \omega t \sin \theta$.

Secondary winding 42 has a pair of terminals 46 and 48, coupled to a tapped autotransformer 22 which is composed of four windings 56, 58, 60 and 62, connected into a standard bridge configuration 22. The terminal 46 from winding 42 and voltage $+E_p \sin \omega t \cos \theta$ is coupled to terminal 64 between windings 56 and 58. Terminal 48 of secondary winding 42 and voltage $-E_p \sin \omega t \cos \theta$ is coupled to terminal 68 which is positioned between windings 60 and 62 of autotransformer 22. Terminal 50 of secondary winding 44 and voltage $+E_p \sin \omega t \sin \theta$ is coupled to terminal 70 of autotransformer 22 between windings 62 and 56, and terminal 52 of secondary winding 44, and voltage $-E_p \sin \omega t \sin \theta$ is coupled to terminal 72 between windings 58 and 60 of the autotransformer 22.

Figure 3:
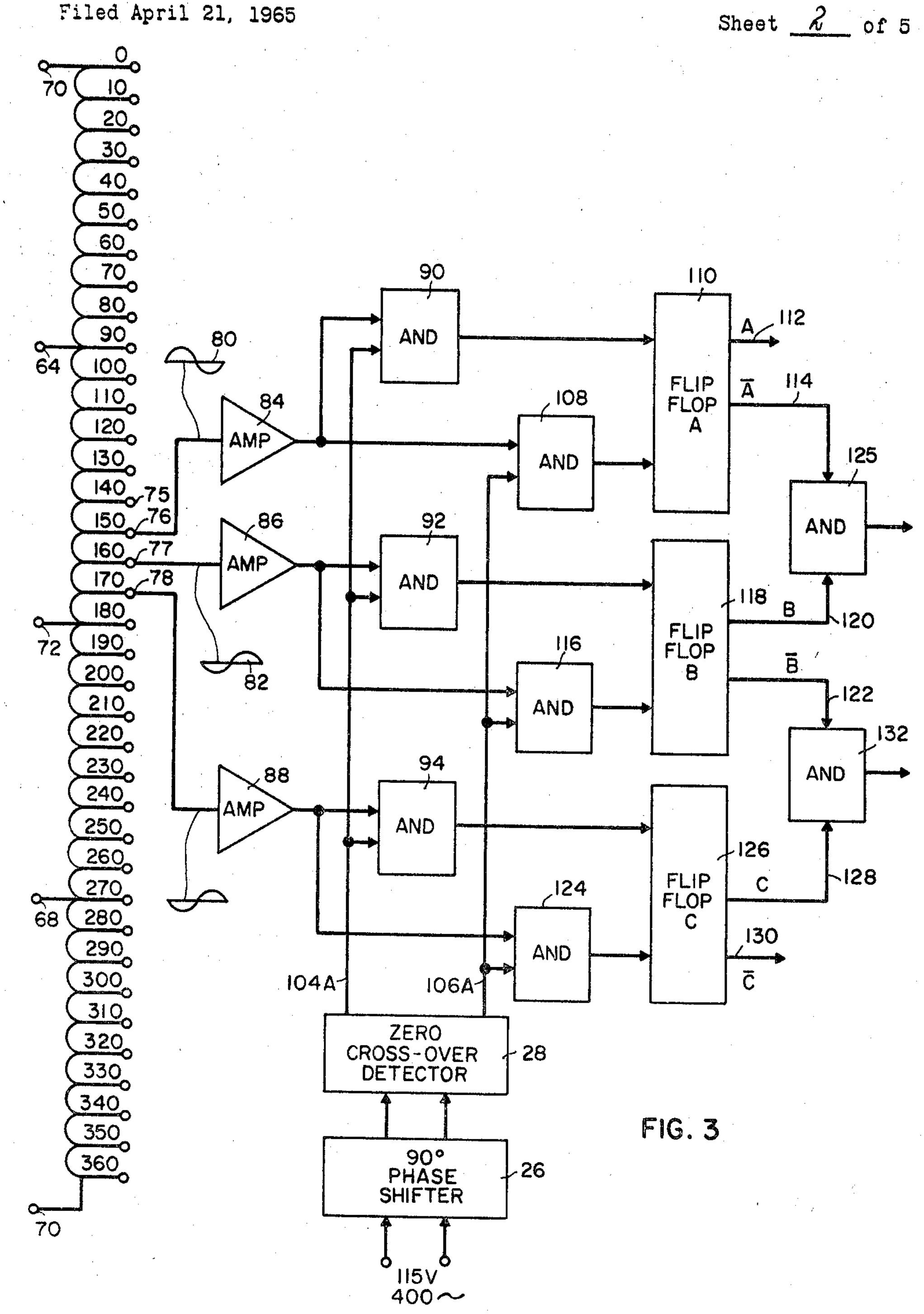
FIG. 3 shows outputs from the tapped transformer shown in FIGURE 2, and illustrates one example of the logic circuitry used for readout signals.

Referring now to FIGURE 3, the tapped autotransformer 22 is shown extended in a linear position and exhibiting each of the tapped outputs that indicates a position of input shaft 10. Readout logic is shown by way of example of taking outputs from three leads at random from the autotransformer 22 which may be designated, for instance, that 150° would be between taps 75 and 76, 160° would be between taps 76 and 77, and 170° would be between taps 77 and 78. If a null is read between 76 and 77, that is, an output read from 76 would be a positive sine wave, as shown by the graph 80, and then lead 77 would exhibit a negative sine wave as shown by the graph 82, then the output should exhibit 160° of rotation of the shaft 10 angle $\theta$.

These outputs are coupled directly into high gain amplifiers 84, 86 and 88 which are used to sense the polarity of the voltages at the taps 76, 77 and 78. Outputs 76, 77 and 78 are coupled from the amplifiers 84, 86 and 88 into AND gates 90, 92 and 94, respectively. The AND gates will be enabled if all the inputs are of a particular phase and in this particular embodiment wherein high true logic is used, both must be of a positive going polarity.

Figure 4:
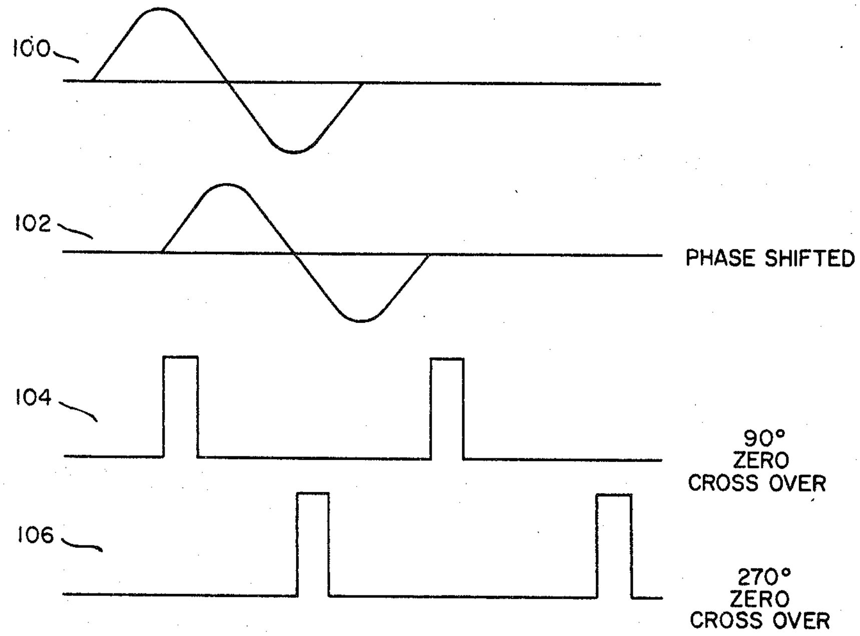
FIGURE 4 illustrates typical graphs of the particular output signals in various locations.

A trigger or clock signal is provided into AND gates 90, 92, and 94 for timing or triggreing by use of a phase shifter 26 and a zero crossover network 28. The original AC carrier signal, 115 volts, 400 cycle, is applied to a 90° phase shifter 26. The input signal is depicted in FIGURE 4 by the reference numeral 100 and as it is phase shifted 90°, as on 102. Therefore, a crossover point is provided at what would normally have been the peak of the signal shown in graph 100. A crossover detector 28 is then used to detect and generate a pulse for each crossover point, shown at 104. Another signal will be emitted on this 90° phase shifting arrangement at the next positive going pulse 100 or the next crossover of the signal 102. FIGURE 4 also shows a pulse 106 which is shown on alternate crossover or for negative going portions of the signal 10 and the signals 104 and 106 appear accordingly on lines 104A and 106A of the output of zero crossover detector 28.

During the positive phase of the carrier signal a pulse will be produced by the zero crossover detector 28 and applied to AND gates 90, 92 and 94 (shown for example). If at this time the carrier signal from the tapped autotransformer 22 produces a signal from any tap 76, 77 or 78 to these same AND gates 90, 92 and 94 and providing these signals are in their positive phase, such signals will enable the AND gates 90, 92 or 94 that have both inputs positive at the same time. AND gates 90, 92 and 94 are coupled directly into the set sides of flip-flops 110, 118 and 126 and all AND gates 90, 92 or 94 which are enabled will set flip-flops 110, 118 or 126 accordingly.

AND gates 108, 116 and 124 are coupled to the zero crossover detector 28 at lead 106A. This output provides a pulse that is phase shifted 180° from the signal on lead 104A. The relationship between these signals is best shown by reference to FIGURE 4.

The signal on lead 106A from the zero crossover detector 28 is positive at the same time a pulse is available from the carrier signal of the same polarity. The lead 106A is coupled to AND gates 108, 116 and 124, and if a positive signal appears on these AND gates the same time a positive pulse is available from the taps 76, 77 or 78, then the AND gate, with such a condition, will be enabled. AND gates 108, 116 and 124 are coupled directly to the reset side of flip-flops 110, 118 and 126. If any of the AND gates 108, 116 or 124 are enabled the flip-flop 110, 118 or 126 will be reset accordingly.

Flip-flop 110 has a pair of output leads 112 and 114 and if, for example, flip-flop 110 is set by AND gate 90, output 112 may be true while output 114 may be false; one is complementary to the other. If flip-flop 110 is reset by AND gate 108 being enabled the output 112 may be false and output 114 may be true. A true signal from flip-flop 110 will hereinafter be designated A and a false signal $\overline{A}$.

Flip-flop 118 has a pair of output leads 120 and 122 and if, for example, flip-flop 118 is set by AND gate 92 the output 120 may be true and output 122 may be false; and if flip-flop 118 is reset by AND gate 116 output 120 may be false and output 122 may be true. A true output from flip-flop 118 will be designated B and a false output $\overline{B}$.

The same holds true with flip-flop 126. It may be set by AND gate 94 producing a true output on output lead 128 (C) and a false output on output lead 130 ($\overline{C}$). If the flip-flop 126 is reset by AND gate 124 then output 128 will go false ($\overline{C}$) and output 130 will go true (C).

Similar circuits are provided for each tap from the autotransformer 22 and the position of the shaft 10 is determined by this logic and further logic to determine which two adjacent flip-flops exhibit opposite conditions; one set while the other is reset. This opposite condition of adjacent flip-flops will indicate that a null exists between the particular taps on transformer bridge 22 that are coupled to these adjacent flip-flops.

To determine this opposite condition, further AND gates are employed. For example and in further reference to FIGURE 3, an AND gate 125 has two inputs, one being from lead 114 from flip-flop 110 and from lead 120 from flip-flop 118. This AND gate 125 is only enabled when lead 114 is A and lead 120 is B. This occurs when flip-flop 110 is reset and flip-flop 120 set. Note at this point 180° ambiguity is eliminated by this circuitry because if the opposite conditions were on both flip-flops 110 and 118 simultaneously, that is, if flip-flop 110 was set and flip-flop 118 was reset, the signals on AND gate 125 would be $\overline{A}\cdot\overline{B}$ thereby not enabled. At this time flip-flop 110 being set and flip-flop 126 being set the inputs to AND gate 132 is $\overline{B}\cdot C$ and it would not be enabled.

By addition of a second synchro transmitter 212 coupled to synchro transmitter 12 by a 36 to 1 gear ratio, this analog-to-digital conversion system can be expanded to provide a higher degree of accuracy. This is accomplished by providing a higher degree of count by further divisions of the output signals from the display 30 of FIGURE 1.

The embodiment shown and explained in FIGURES 1, 2 and 3 can only display outputs of only 10° increments.

Figure 5:
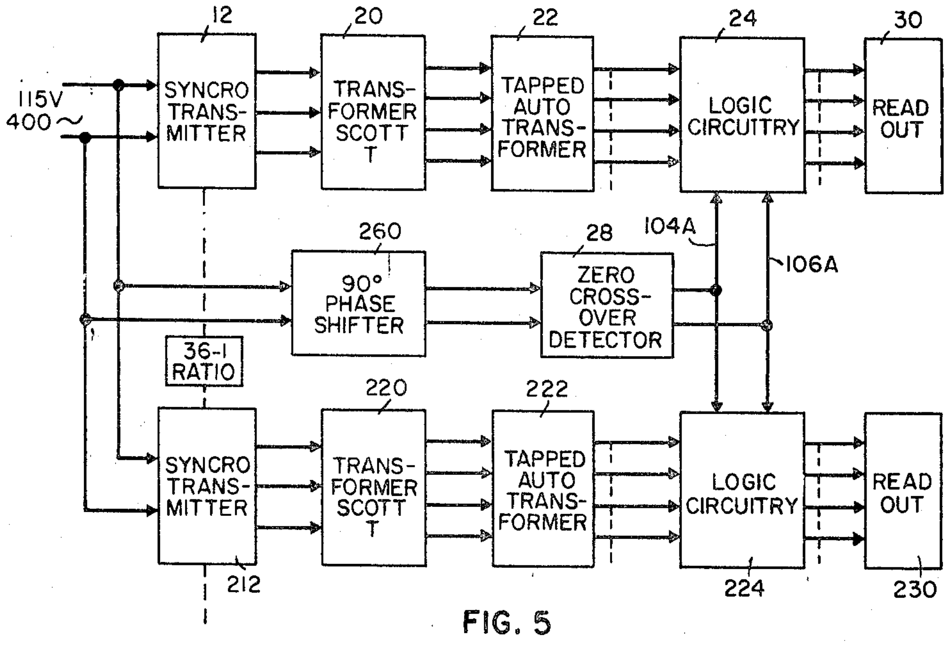
FIGURE 5 is a block diagram of another embodiment which includes a high speed section of the invention.

To further implement this embodiment reference is made to FIGURE 5 in which a synchro 212 is coupled to a Scott T transformer 220 in the sam emanner as the synchro 12 and Scott T transformer 20. Further, an autotransformer 222 is coupled to the Scott T transformer 220 in the same manner as autotransformer 22 and Scott T transformer 20.

Autotransformer 222 is coupled in the same bridge configuration as autotransformer 22 and each winding or quadrant thereof has 25 taps making a total of 100 taps. Logic circuitry 224 is coupled to the autotransformer 222 and the zero crossover detector 28 to present readout indicative of the shaft 10 on the readout display 230.

For each 10° of rotation of the shaft 10, synchro 212 is rotated 360° producing a readout on the display 230 from 0.0 to 9.9 depending upon the position of the null in autotransformer 222. Hence a practical readout of the display 30 would be 00 to 35 and the readout on display 230 would be 0.0 to 9.9, thus providing an output to .1° of accuracy.

Figure 6:
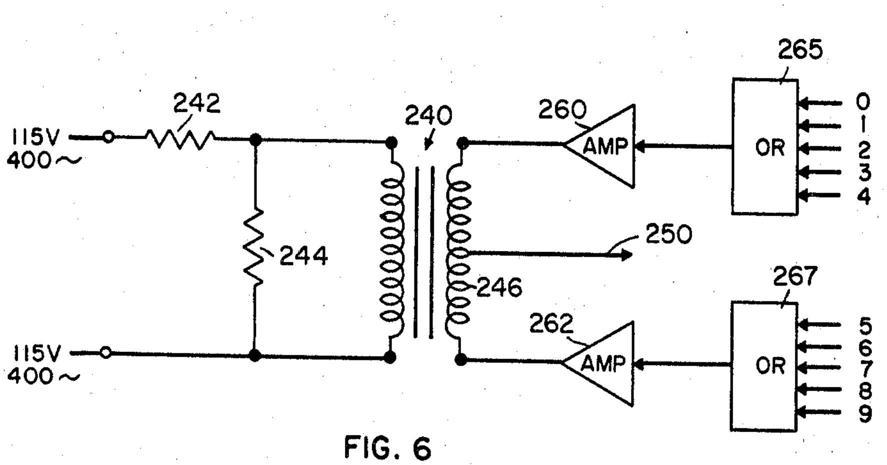
FIGURE 6 is a schematic and block diagram illustrating a synchronization mode used in connection with the invention.

Use of separate sections for each synchro speed makes it necessary to synchronize the outputs. The one-speed section denotes 10° increments, and 36-speed section gives the final accuracy to .1° increments. Since the error of the one-speed section may be greater than one degree, some sort of lead/lag network is added to the one speed section whenever numbers exist in a transition region of 9.9° to 0.0°. This is achieved by circuitry shown in FIGURE 6. The reference voltage is applied to a transformer 240. The amount of voltage induced in the transformer 240 is a function of the ratio and the resistors 242 to the resistors 244. If higher voltage is needed, resistors 242 are lowered in respect to resistors 244. A center tap from the output winding 246 is coupled into the center tap of winding 42 and 44 Scott T configuration, as shown in FIGURE 2.

An ambiguity will arise when the null on the tapped autotransformer 22 is exactly upon a single tap, wherein the output therefrom will be of neither polarity. This is referred to as "dead band." The logic from any tap exhibiting a dead band will not function because of the lack of signal from it. Therefore, some means must be devised to move the null between the taps. This is accomplished by placing an AC component of a particular value upon the transformer 22 of FIGURE 5, with the center tap of the winding 246 coupled to the transformer 240 of FIGURE 6. This AC component is placed upon the Scott T transformer 20 from the transformer 240 to overcome the dead band to either raise the signal to a higher position or lower it, depending upon the position of the high speed transformer 222.

A hypothetical situation might further explain this operation. If the null signal is on the one-speed shaft 10, its dead band at the tap between position 250° and 260° the output might read either 250° or 260°, or nothing. The error in this particular hypothetical situation would be plus or minus 10°. Therefore, an AC component introduced upon the Scott T transformer 20 will rectify this signal wherein the correct output will be read out. To determine exactly which direction to force the null depends upon the position of the 36 speed shaft. If the readout is in the position of 0.0 to 4.9, the null will be forced toward the 25, and if the position is 5.0 to 9.9, the null is forced toward the 26, and in either case the output therefrom will be accurate within ±.1°

To implement this AC component upon the Scott T transformer 20, the voltage is introduced into the winding 246 from either the amplifier 260 or 262, depending upon the position of the 36-speed shaft. If the position of the shaft is in the 0.0 to 4.9 position, then the amplifier 260 will be saturated and current will flow from this amplifier through the center tap to the Scott T transformer at a particular polarity. If, on the other hand, the output from the 36-speed shaft is 4.9 to 9.9, amplifier 262 will be conductive and current will flow from this amplifier through the winding 246 and into the Scott T transformer 20 from a different polarity.

One way to trigger amplifiers 260 and 262 would be by an OR gate coupled to each amplifier wherein OR gate 265 is coupled to the amplifier 260 and has a plurality of inputs 0, 1, 2, 3 and 4 which might come from the logic circuitry readout 230 shown in FIGURE 5 where an OR gate 265 would be enabled when any readout is 0, 1, 2, 3 or 4. Likewise, OR gate 267 is coupled to the amplifier 262 where an amplifier 262 is enabled when OR gate 267 is enabled and OR gate 267 is enabled when any readout from the logic readout circuitry 230 is 5, 6, 7, 8 or 9.

Figure 7:
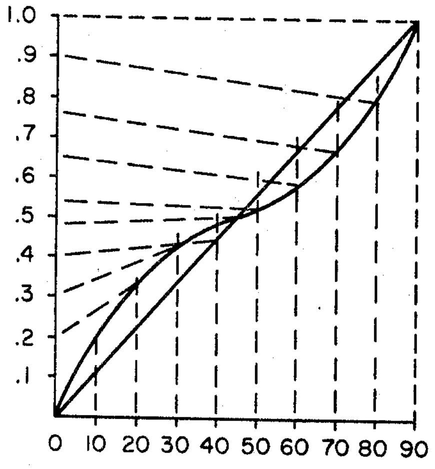
FIGURE 7 is a graph illustrating the non-linearity of the transformation member vs. the shaft angle.

A definite correlation exists between the synchro 12, shaft angle $\theta$, and the position of the null along the autotransformer 22. This relation is $$\alpha=\frac{\sin \theta}{\sin \theta-\cos \theta}$$

where $\alpha$ is the transformation ratio of the taps. By plotting the function it may be seen that this equation is a non-linear function, as demonstrated in FIGURE 7. Therefore, to overcome this non-linearity, the position of the taps are placed in a non-linear form to bring the function as close to being linear as possible. This is accomplished by staggering the position of the taps from the autotransformer 22 as shown by the graph in FIGURE 7. The readout displays 30 and 230 may be in some visual form such as a counter, or the like, wherein the readout display 30 might count from 0 to 35, which would be dependent upon the position of the null in the autotransformer 22. The position of the readout display 230 would also be of the same type as visual display 30 and be a counter that counts from 0.0 to 9.9. This, or any other type of display, may be used and is widely known throughout the art.

Figure 8:
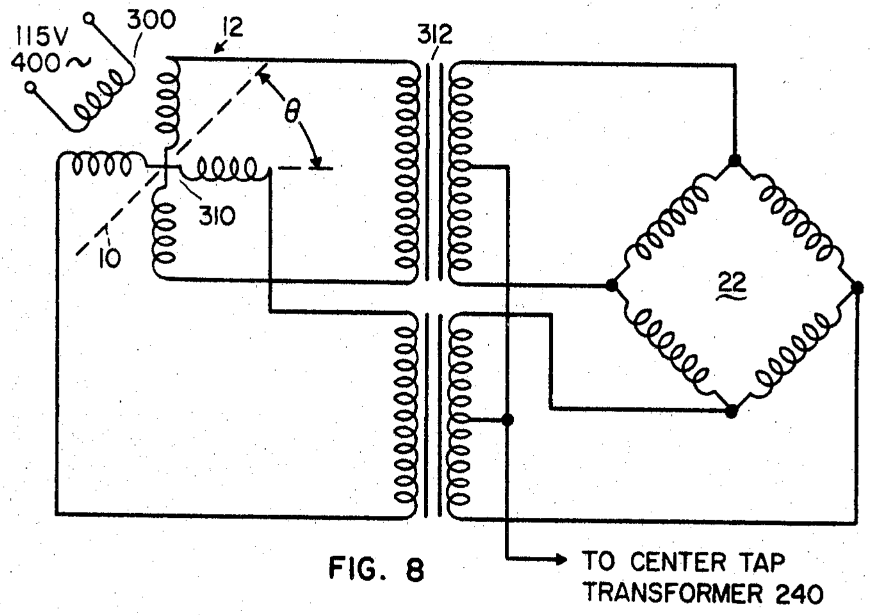
FIGURE 8 is a schematic diagram illustrating another embodiment of the invention using a resolver as a trigonometric function generator.

Another embodiment of the invention is shown in FIGURE 8 wherein in place of a synchro, the carrier signal modulation device is comprised of a resolver. As is well known in the art, a resolver is a device which provides an output voltage which has an amplitude proportional to the sine or cosine of the input shaft 10 position. A resolver can be compared to a transformer. In normal operation, a resolver stator 300 which is similar to a transformer primary is excited with an alternating voltage. The resolver rotor 310 is magnetically coupled to the stator similar to the coupling between a transformer secondary and primary. In a resolver, however, the rotor 310 can be positioned with respect to the stator and the coupling varies with the shaft 10 rotation. The resolver 12 is designed so that the variable coupling produces output voltage amplitudes equal to the sine and cosine of the angular position of the shaft 10. Therefore, in this embodiment, the need for a Scott T transformer, such as in the previous embodiment of FIGURE 1, is eliminated. In the place thereof a transformer 312 would be used to provide an isolation between the autotransformer 22 and the resolver 12 and provides for positive and negative going functions of the sine and the cosine of the angle of the shaft 10 as previously described. Also, the center tap 312 is used to provide center tap position which is coupled into the synchronization mode transformer 240 at the center tap output 250.

Figure 9:
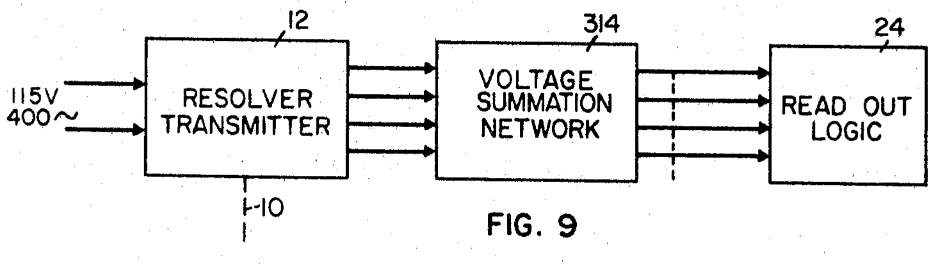
FIGURE 9 is a block diagram illustrating another embodiment of the invention including a resolver and using a summation network.

It can be seen that when taken in connection with FIGURE 9 an autotransformer 22 is not always necessary for implementation of the outputs but rather some voltage summation network consisting of a resistive network or the like which is well known in the art can be substituted in the place of the autotransformer and is designated in the FIGURE 9 by the number 314. The output therefrom would be a plurality of taps indicative of the null position of the shaft 10 which would then be coupled into the readout logic 24.

Figure 10:
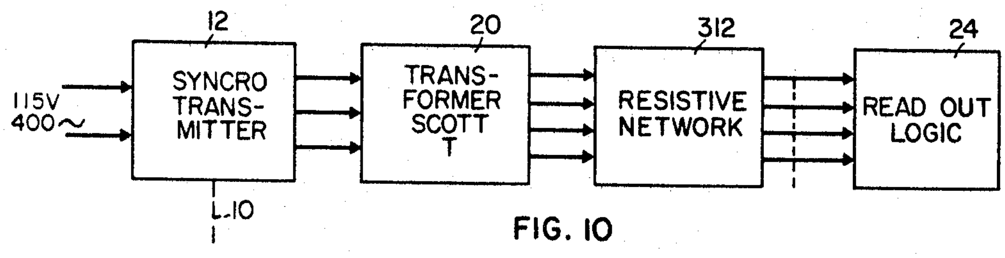
FIGURE 10 is a block diagram illustrating another embodiment of the invention including the synchro and Scott T transformer with the summation network.

FIGURE 10 illustrates wherein the voltage summation network 312 could be positioned from the Scott T transformer 240 thereby providing resistive taps fed into the readout logic 24. The readout logic would be similar to that shown in FIGURES 1 and 2 that is further explained in connection in FIGURE 3 whereby a plurality of taps from the resistive network would be coupled directly into amplifiers such as amplifier 84, 86 and 88.

Having thus described preferred embodiments of this invention, what is claimed is:

1. An analog-to-digital conversion system comprising a first means for converting a shaft angle into a plurality of modulated carrier signals, a second means coupled to said first means for converting said carrier signals into signals having instantaneous values, and a plurality of tapped autotransformers coupled in a bridge configuration coupled to said second means for receiving said instantaneous values.

2. An analog-to-digital conversion system as set forth in claim 1 wherein said taps on said autotransformer are positioned in a non-linear position to overcome the non-linearity of the function;

$$\alpha=\frac{\sin \theta}{\cos \theta-\sin \theta}$$

wherein $\alpha$=the transformation ratio of said autotransformer and $\theta$=the angle of said shaft.

3. An analog-to-digital conversion system comprising a means for providing an AC carrier signal, a rotatable shaft, a means for converting said carrier signal to signals modulated indicative of the angular position of said shaft, a means for converting said modulated signals to a plurality of signals of a modulated relationship, and transformer bridge coupled to said plurality of signals of a modulated relationship.

4. An analog-to-digital conversion system as set forth in claim 3 wherein said transformer bridge has a plurality of tapped outputs.

5. An analog-to-digital conversion system as set forth in claim 3 wherein said means for converting said carrier signals to signals modulated indicative of the angular position of said shaft is a synchro.

6. An analog-to-digital conversion system as set forth in claim 3 wherein said means converting said modulated signals to a plurality of signals of a modulated relationship in a Scott T transformer.

7. An analog-to-digital conversion system as set forth in claim 4 wherein said autotransformer bridge provides a null between taps indicative of said shaft position wherein one tap provides an output signal of one plurality and a second tap provides an output of a second polarity.

8. An analog-to-digital conversion system as set forth in claim 7 including logic circuitry to determine which adjacent taps have signals of opposite polarities.

9. An analog-to-digital conversion system as set forth in claim 8 wherein said logic circuitry comprises a means for determining the polarity of a single tap from said autotransformer, a bistable member coupled to said means having a pair of output paths which are complementally enabled depending upon the state of said bistable member.

10. An analog-to-digital conversion system as set forth in claim 9 including a threshold amplifier coupled between said taps and said polarity determining means and adapted to provide a pulse when a signal on a said single tap is of a threshold level in a particular phase.

11. An analog-to-digital conversion system as set forth in claim 6 wherein said logic circuitry comprises a first gate coupled to a single tap of said autotransformer, a second gate coupled to said single tap, means enabling said first gate when a signal of one particular phase is detected on said single tap and enabling said second gate when a signal of said second particular phase is detected on said single tap, a bistable member coupled to said first and said second gate and having a pair of output paths exhibiting signals complementary to each other, depending upon the particular phase detected upon said single tap.

12. An analog-to-digital conversion system as set forth in claim 11 wherein said bistable member is a set-reset type flip-flop having a reset input path coupled to said first gate and a set input path coupled to said second gate.

13. An analog-to-digital conversion system as set forth in claim 11 including a means for providing a gating signal having a pair of output paths, one of said output paths coupled to said first gate and adapted to enable said first gate when a particular signal is present on said single tap of said autotransformer, and the other of said output paths coupled to said second gate and adapted to enable said second gate when a different particular signal is present on said single tap.

14. An analog-to-digital conversion system as set forth in claim 7 wherein each said autotransformer has a plurality of tapped output paths which provide an output indicative of the angle of said synchro shaft on one single output path.

15. An analog-to-digital conversion system as set forth in claim 14 wherein said taps of said autotransformer are positioned in a non-linear relationship to overcome the nonlinear transformation ratio of said conversion system.

16. An analog-to-digital conversion system comprising a synchro having an input shaft and at least three output paths, said output paths exhibiting modulated carrier voltages indicative of the rotational angle of said shaft, a Scott T transformer coupled to said output paths of said synchro and having at least four output paths, at least four autotransformers coupled in a bridge configuration and having a plurality of tapped outputs, said autotransformer coupled to said Scott T transformer, said output paths of said autotransformer divided between each quadrant thereof in predetermined positions, and logic circuitry coupled to said autotransformer for determining which of two divisions of said autotransformer exhibits signals of opposite phases.

17. An analog-to-digital conversion system comprising a synchro having an input shaft and at least three output paths, said output paths exhibiting modulated carrier voltages indicative of the rotational angle of said shaft, a Scott T transformer coupled to said output paths of said synchro and having at least four output paths, at least four autotransformers coupled in a bridge configuration and having a plurality of tapped outputs, said autotransformer coupled to said Scott T transformer, said output paths of said autotransformer divided between each quadrant thereof in predetermined positions, a plurality of amplifiers coupled to each of said output taps of said autotransformer and logic circuitry coupled to said threshold amplifiers for determining which of two said threshold amplifiers exhibits signals of opposite phase.

18. An analog-to-digital conversion system comprising a first means for converting a shaft angle into a plurality of modulated carrier signals, a second means coupled to said first means for converting said carrier signal into signals having instantaneous values equal to $\pm E_p \sin \omega t \sin \theta$ and $\pm E_p \sin \omega t \cos \theta$, wherein $E_p$ is the value of the carrier signal, $\omega t$ equals the instantaneous position of the carrier frequency, and $\theta$ is the angle of said shaft, and a first transformation means coupled to said second means for receiving said instantaneous values, said transformation means includes a plurality of tapped autotransformers coupled in a bridge configuration, and logic circuitry coupled to said transformation means for determining the position of said shaft indicated by a null output from said transformation means.

19. An analog-to-digital conversion system as set forth in the claim 18 wherein said logic circuitry includes a means for determining the phase of a signal on said taps and means for determining between which taps said null output exists.

20. An analog-to-digital conversion system comprising a first means for converting a shaft angle into a plurality of modulated carrier signals, a second means coupled to said first means for converting said carrier signals into signals having instantaneous values equal to:

$$\pm E_p \sin \omega t \sin \theta$$

and $$\pm E_p \sin \omega t \cos \theta$$

wherein $E_p$ is the value of the carrier signal, $\omega t$ equals the instantaneous position of the carrier frequency, and $\theta$ is the angle of said shaft, a transformation means coupled to said second means for receiving said instantaneous values, and logic circuitry coupled to said transformation means for determining the position of said shaft indicated by a null output from said transformation means.

21. An analog-to-digital conversion system comprising a means for providing an AC carrier signal, a rotatable shaft, a means for converting said carrier signals modulated indicative of the angular position of said shaft, a means for converting said modulated signals to a plurality of signals of a modulated relationship, a plurality of autotransformer bridges coupled to said plurality of signals in a modulated relationship, said autotransformers having a plurality of taps adapted to provide an AC signal of first said relationship and a second said relationship, means coupled to said taps of said autotransformer to detect which adjacent taps have signals indicative of opposite relationships.

22. An analog-to-digital conversion system comprising a synchro having an input shaft and at least three output paths, said output paths exhibiting modulated carrier voltages indicative of the rotational angle of said shaft, a Scott T transformer coupled to said output paths of said synchro and having at least four output paths, one of said output paths of said Scott T transformer having a voltage equal $+E_p \sin \omega t \sin \theta$, said second output path equal to $-E_p \sin \omega t \sin \theta$, said third output path equal to $+E_p \sin \omega t \cos \theta$, and the fourth output path equal to $-E_p \sin \omega t \cos \theta$, wherein $E_p$ equals the voltage of said modulated carrier signal, $\omega t$ is the instantaneous position of the carrier frequency, and $\theta$ is the angle of said synchro shaft, at least four autotransformers coupled in a bridge configuration and having a plurality of tapped outputs, said autotransformers coupled to said Scott T transformer, said output taps of said autotransformers divided between each quadrant thereof in predetermined positions, a plurality of amplifiers coupled to each of said output taps of said autotransformer, and logic circuitry coupled to said amplifiers for determining which of two adjacent of said amplifiers exhibits signals of opposite phases.

23. An analog-to-digital conversion system comprising a synchro having an input shaft and at least three output paths, said output paths exhibiting modulated carrier voltages indicative of the rotational angle of said shaft, a Scott T transformer coupled to said output paths of said synchro and having at least four output paths, one of said output paths of said Scott T transformer having a voltage equal to $+E_p \sin \omega t \sin \theta$, said second output path equal to $-E_p \sin \omega t \sin \theta$, said third output path equal to $+E_p \sin \omega t \cos \theta$, and the fourth output path equal to $-E_p \sin \omega t \cos \theta$, wherein $E_p$ equals the magnitude of voltage of said modulated carrier signal, $\omega t$ is the instantaneous position of the carrier frequency, and $\theta$ is the angle of said synchro shaft, at least four autotransformers coupled in a bridge configuration and having a plurality of tapped outputs, said autotransformer coupled to said Scott T transformer wherein said output path carrying $-E_p \sin \omega t \cos \theta$ is coupled 180° on said bridge opposed to said output path of said Scott T transformer carrying said $+E_p \sin \omega t \cos \theta$, and coupled to input paths to said autotransformer bridge is the output path $+E_p \sin \omega t \sin \theta$, and disposed 180° from said output path $-E_p \sin \omega t \cos \theta$, is said output path carrying said signal $-E_p \sin \omega t \sin \theta$, said output paths of said autotransformer divided between each quadrant thereof in predetermined positions, a plurality of amplifiers coupled to each of said output taps of said autotransformer and logic circuitry coupled to said threshold amplifiers for determining which of two said threshold amplifiers exhibits signals of opposite phases.

References Cited

UNITED STATES PATENTS

| | | | |
|---|---|---|---|
| 2,894,256 | 7/1959 | Kronacher | 340—347 |
| 3,156,907 | 11/1964 | Lanning et al. | 340—347 |
| 2,966,300 | 12/1960 | Dickenson | 340—347.3 |
| 3,205,492 | 9/1965 | Young et al. | 340—347 |

MAYNARD R. WILBUR, *Primary Examiner.*

JEREMIAH GLASSMAN, *Assistant Examiner.*

U.S. Cl. X.R.

340—198